(12) United States Patent
Huang et al.

(10) Patent No.: US 8,985,800 B2
(45) Date of Patent: Mar. 24, 2015

(54) HEAT-DISSIPATING ELEMENT, MANUFACTURING METHOD AND BACKLIGHT MODULE THEREOF

(71) Applicant: Shenzhen China Star Optoelectronics Technology Co., Ltd., Shenzhen, Guangdong (CN)

(72) Inventors: Chong Huang, Shenzhen (CN); Yuchun Hsiao, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 127 days.

(21) Appl. No.: 13/699,701

(22) PCT Filed: Oct. 31, 2012

(86) PCT No.: PCT/CN2012/083824
§ 371 (c)(1),
(2) Date: Nov. 23, 2012

(87) PCT Pub. No.: WO2014/059699
PCT Pub. Date: Apr. 24, 2014

(65) Prior Publication Data
US 2014/0111971 A1 Apr. 24, 2014

(30) Foreign Application Priority Data

Oct. 18, 2012 (CN) .......................... 2012 1 0397053

(51) Int. Cl.
*F28F 3/02* (2006.01)
*F28F 21/00* (2006.01)
*F21V 29/00* (2006.01)
*B23P 15/26* (2006.01)
*B21D 53/02* (2006.01)

(52) U.S. Cl.
CPC . *F28F 3/02* (2013.01); *B23P 15/26* (2013.01); *F21V 29/004* (2013.01); *Y10T 29/4935* (2015.01); *F21V 29/00* (2013.01); *B21D 53/02* (2013.01)
USPC ........ 362/97.3; 362/97.2; 362/97.1; 362/602; 362/217.1; 165/185

(58) Field of Classification Search
USPC ................................ 362/97.2, 97.3, 602–608
See application file for complete search history.

(56) References Cited

U.S. PATENT DOCUMENTS

| | | | |
|---|---|---|---|
| 6,269,002 B1 * | 7/2001 | Azar | 361/703 |
| 6,901,993 B2 * | 6/2005 | Lee et al. | 165/80.3 |
| 6,906,259 B2 * | 6/2005 | Hayashi | 174/520 |
| 7,345,882 B2 * | 3/2008 | Lee et al. | 361/710 |
| 7,810,959 B2 * | 10/2010 | Hsu et al. | 362/294 |

(Continued)

*Primary Examiner* — Sikha Roy
(74) *Attorney, Agent, or Firm* — Andrew C. Cheng

(57) ABSTRACT

The present invention discloses a manufacturing method of heat-dissipating element, including the following steps: processing a heat-dissipating element body with a bottom plate and at least two stop plates, the stop plates being disposed at two sides of the bottom plate and bending towards surface; cutting from the bottom plate of the heat-dissipating element body to form heat-dissipating element, the dissipating element at least comprising two heat-dissipating elements of same shape or of symmetric shape. The present invention also discloses a heat-dissipating element and backlight module manufactured by the above method. The heat-dissipating element, manufacturing method and backlight module thereof can maintain optimal heat-dissipation effect and save material used to lower cost.

10 Claims, 4 Drawing Sheets

(56) References Cited

U.S. PATENT DOCUMENTS

| | | | |
|---|---|---|---|
| 2005/0056398 A1* | 3/2005 | Lai | 165/80.3 |
| 2009/0244909 A1* | 10/2009 | Chen | 362/368 |
| 2010/0277664 A1* | 11/2010 | Kim et al. | 349/58 |
| 2010/0321459 A1* | 12/2010 | Yamaguchi et al. | 347/211 |
| 2011/0110087 A1* | 5/2011 | Hochstein | 362/249.02 |

* cited by examiner

HEAT-DISSIPATING ELEMENT, MANUFACTURING METHOD AND BACKLIGHT MODULE THEREOF

The present application claims priority of "HEAT-DISSIPATING ELEMENT, MANUFACTURING METHOD AND BACKLIGHT MODULE THEREOF", application number 201210397053.2 submitted to State Intellectual Property Office, People Republic of China dated Oct. 18, 2012.

BACKGROUND OF THE INVENTION

1. Field of the Invention

The present invention relates to the field of liquid crystal displaying techniques, and in particular to a heat-dissipating element, manufacturing method and backlight module thereof.

2. The Related Arts

A liquid crystal display device comprises a display module. The display module, for displaying an image, uses a backlight to supply light source. The current backlight source is mainly cold cathode fluorescent lamp (CCFL) and light-emitting diode (LED). At present, the LED is a newer type of light source. Because of the advantages of small size, small energy consumption and easy to realize thin design of backlight module, LED is becoming the mainstream choice of backlight source.

FIG. 7 is a schematic view showing the structure of an aluminum extrusion used in known direct-lit backlight module, wherein aluminum extrusion 9 has a rectangular shape and is disposed on two opposite sides of light-emitting side of the backlight module. As the heat distribution is not uniform when the backlight module operates, the heat from LED concentrates on the upper and middle part of the backlight module. The current heat-dissipating element cannot meet the requirement of heat-dissipation.

The current heat-dissipating aluminum extrusion is not only unable to achieve optimal heat-dissipation, but also wastes construction material and is unsuitable for cost down.

SUMMARY OF THE INVENTION

The technical issue to be addressed by the present invention is to provide a heat-dissipating element, manufacturing method and backlight module thereof, able to maintain optimal heat-dissipation effect and save material for cost down.

The present invention provides a manufacturing method of heat-dissipating element, which comprises: processing a heat-dissipating element body with a bottom plate and at least two stop plates, the stop plates being disposed at two sides of the bottom plate and bending towards surface; cutting from the bottom plate of the heat-dissipating element body to form heat-dissipating element, the dissipating element at least comprising two heat-dissipating elements of same shape or of symmetric shape.

According to a preferred embodiment of the present invention, the step of cutting the heat-dissipating element body to form heat-dissipating element satisfies the following condition: the bottom plate of the heat-dissipating element has a trapezoidal shape.

According to a preferred embodiment of the present invention, the two stop plates bend towards the same surface of the bottom plate.

According to a preferred embodiment of the present invention, the step of cutting the heat-dissipating element body to form heat-dissipating element comprises: stamping to cut the heat-dissipating element body to form two heat-dissipating elements of the same shape.

According to a preferred embodiment of the present invention, the heat-dissipating element body is manufactured by extrusion.

According to a preferred embodiment of the present invention, the heat-dissipating element body has a rectangular shape.

According to a preferred embodiment of the present invention, the heat-dissipating element body is aluminum extrusion.

According to a preferred embodiment of the present invention, the heat-dissipating element is aluminum extrusion.

The present invention provides a heat-dissipating element manufactured by the aforementioned manufacturing method, which comprises: a bottom plate and a stop plate, the stop plate being disposed at one side of the bottom plate and bending towards surface, the bottom plate comprising a top edge and a bottom edge located at two opposite ends, length of the top edge being greater than length of bottom edge.

According to a preferred embodiment of the present invention, the bottom plate of the heat-dissipating element has a trapezoidal shape.

According to a preferred embodiment of the present invention, the bottom plate of the heat-dissipating element has a trapezoidal shape and a right angle, and the stop wall is disposed at one side of the right angle of the trapezoid.

According to a preferred embodiment of the present invention, the heat-dissipating element is formed by cutting.

According to a preferred embodiment of the present invention, the heat-dissipating element is aluminum extrusion.

The present invention provides a backlight module, which comprises: an LED backlight source, the LED backlight source comprising at least a heat-dissipating element, wherein the heat-dissipating element comprising a bottom plate and at least two side stop plates, the stop plates being disposed at two sides of the bottom plate and bending towards surface, the bottom plate comprising the top edge located at two ends and the bottom edge, length of the top edge being greater than length of bottom edge; the end of the top edge of the heat-dissipating element being disposed at the end wherein the heat generated by the LED backlight source concentrating.

According to a preferred embodiment of the present invention, the bottom plate of the heat-dissipating element has a trapezoidal shape.

According to a preferred embodiment of the present invention, the bottom plate of the heat-dissipating element has a trapezoidal shape and a right angle, and the stop wall is disposed at one side of the right angle of the trapezoid.

According to a preferred embodiment of the present invention, the heat-dissipating element is formed by cutting.

According to a preferred embodiment of the present invention, the heat-dissipating element is aluminum extrusion.

The efficacy of the heat-dissipating element, manufacturing method and backlight module thereof is: because a heat-dissipating element body can be cut into at least two heat-dissipating elements of same shape or symmetrical shape, the heat-dissipating aluminum extrusion of the same specification can be manufactured for a large amount to improve manufacturing efficiency as well as preparing trapezoidal heat-dissipating element to match the shape of heat concentrated area of the backlight source of the backlight module to maintain optimal heat-dissipating effect. As such, the material used in manufacturing heat-dissipating elements is saved for cost down.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

The following refers to drawings to describe the preferred embodiment of the present invention in details.

Figure 1:
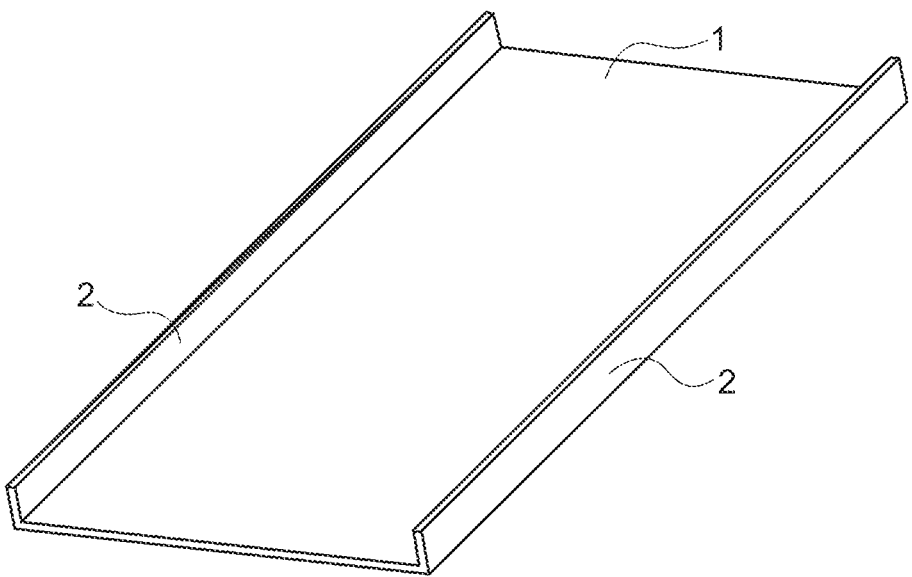
FIG. 1 is a schematic view showing the structure of a heat-dissipating element body manufactured by the first embodiment of the manufacturing method of heat-dissipating element according to the present invention.
Figure 2:
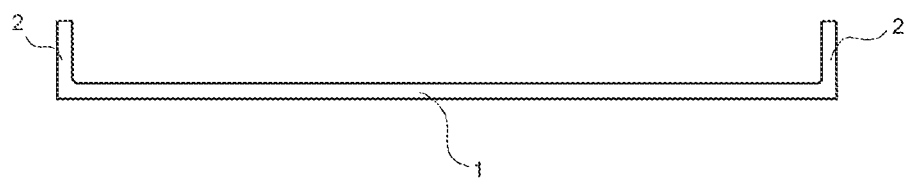
FIG. 2 is a cross-sectional view showing the structure of a heat-dissipating element body manufactured by the first embodiment of the manufacturing method of heat-dissipating element according to the present invention.
Figure 3:
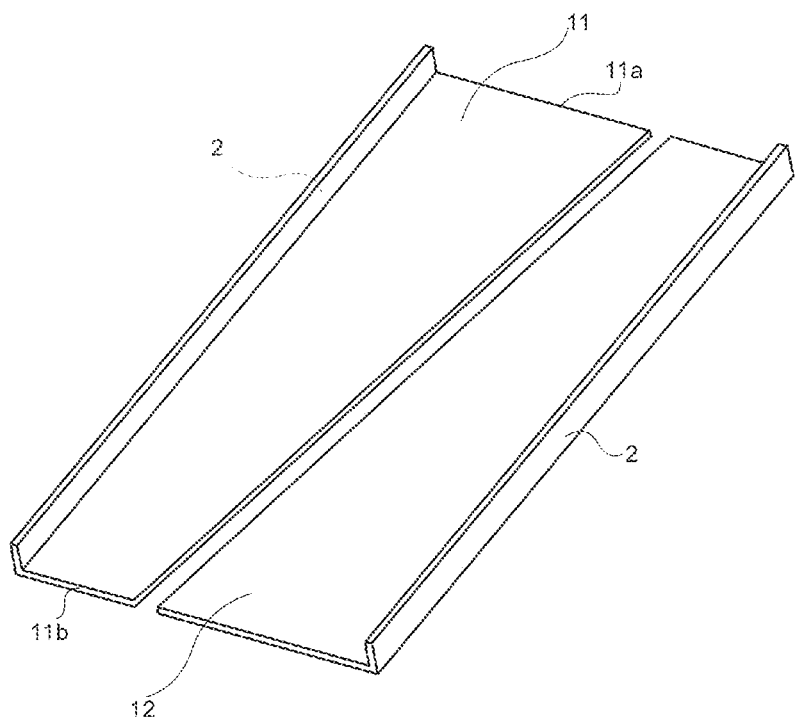
FIG. 3 is a schematic view showing the structure of cutting part of a heat-dissipating element manufactured by the first embodiment of the manufacturing method of heat-dissipating element according to the present invention.

Referring to FIGS. 1-3, FIGS. 1-3 are the first embodiment of a manufacturing method of heat-dissipating element according to the present invention.

A manufacturing method of heat-dissipating element of the present invention comprises the following steps.

Step 1: processing a heat-dissipating element body with a bottom plate and at least two side stop plates.

FIG. 1 is a schematic view showing the structure of a heat-dissipating element body manufactured by the first embodiment of the manufacturing method of heat-dissipating element according to the present invention. In step 1, the heat-dissipating element is an aluminum extrusion of a rectangular overall shape. The aluminum extrusion comprises a bottom plate 1 and two stop plates 2. The stop plates 2 are disposed at two sides (left and right sides as shown in FIG. 1) of the bottom plate and bend towards a same surface of bottom plate 1.

In this embodiment, the heat-dissipating element body can be manufactured through extrusion, suitable for control product quality.

FIG. 2 is a cross-sectional view showing the structure of a heat-dissipating element body manufactured by the first embodiment of the manufacturing method of heat-dissipating element according to the present invention, wherein the size and disposition of two stop plates 2 are the same and vertically disposed towards the same surface of the bottom plate 1.

The bottom plate 1 has a trapezoidal shape with a right angle, and the stop wall 2 is disposed on one side of the right angle of the trapezoidal.

The bending direction of the two stop plates 2 and the overall shape of the heat-dissipating element body being rectangular determine the shape of the heat-dissipating element obtained in the cutting step, as well as enable mass production of the heat-dissipating aluminum extrusion of the same specification.

Step 2: cutting from the bottom plate of the heat-dissipating element body to form heat-dissipating element, the dissipating element at least comprising two heat-dissipating elements of same shape.

FIG. 3 is a schematic view showing the structure of cutting part of a heat-dissipating element manufactured by the first embodiment of the manufacturing method of heat-dissipating element according to the present invention. Specifically, the cutting is performed through stamping from one end of the aluminum extrusion bottom plate 1 to the end at the other side. The position to cut is not restricted to any specific position. However, the step of cutting the heat-dissipating element body to form heat-dissipating element must satisfy the following condition: able to cut by stamping the heat-dissipating element body to form two heat-dissipating elements of the same shape. The purpose is to increase the production volume of the heat-dissipating aluminum extrusion of the same specification to improve production efficiency and lower the cost.

Furthermore, the heat-dissipating element body must be cut to form heat-dissipating elements with an overall trapezoidal shape. Because the trapezoidal aluminum extrusion makes better match to the heat distribution generated by the backlight source of the backlight module when operating, the trapezoidal aluminum extrusion can achieve better heat-dissipating effect through appropriate installation.

Figure 4:
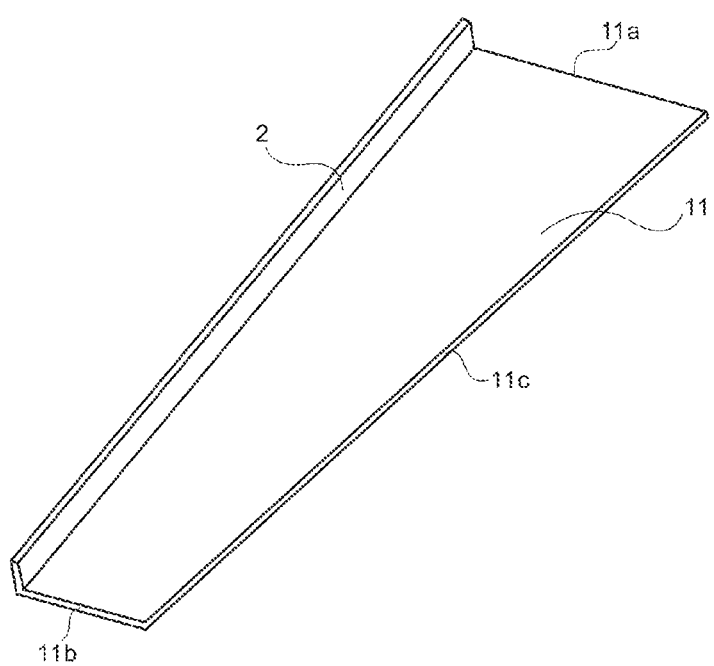
FIG. 4 is a schematic view showing the structure of a heat-dissipating element manufactured by the first embodiment of the manufacturing method of heat-dissipating element according to the present invention.

FIG. 4 is a schematic view showing the structure of a heat-dissipating element manufactured by the first embodiment of the manufacturing method of heat-dissipating element according to the present invention.

The aluminum extrusion of the instant embodiment comprises: a bottom plate 11 (half of the surface area of the bottom plate 11 of heat-dissipating element body) and a stop plate 2. The stop plate 2 is disposed at two sides of the bottom plate 11 and bends towards surface. The bottom plate 11 comprises a top edge 11a and a bottom edge 11b located at two opposite ends. The overall shape of the heat-dissipating aluminum extrusion is trapezoidal.

The length of top edge 11a and the length of bottom edge 11b are different, the purpose is: to maintain the two ends of the aluminum extrusion have different surface area. In other words, the surface area next to top edge 11a of the aluminum extrusion is larger than the surface area next to bottom edge 11b of the aluminum extrusion, and the effective heat-dissipating area shrinks gradually from the to edge 11a towards the bottom edge 11b. As such, the structure matches the heat distribution generated by backlight source of the backlight module when operating. Based on maintaining the optimal heat-dissipation effect, the structure can save the material used in bottom plate 11 to lower the cost.

In addition, the side 11c of bottom plate 11 opposite to stop plate 2 is not limited to the straight line. The side 11c can be cut in any shape as long as satisfying the condition that the length of the top edge is greater than the length of bottom edge.

Figure 5:
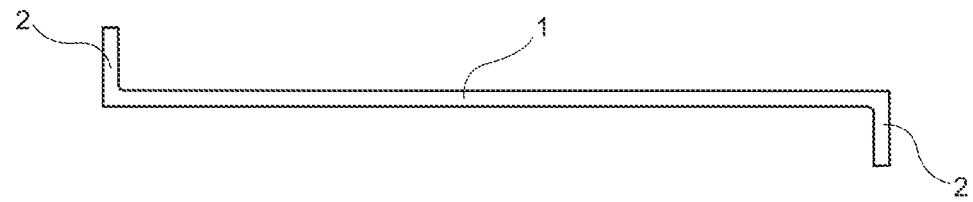
FIG. 5 is a cross-sectional view showing the structure of a heat-dissipating element body manufactured by the second embodiment of the manufacturing method of heat-dissipating element according to the present invention.

FIG. 5 is a cross-sectional view showing the structure of a heat-dissipating element body manufactured by the second embodiment of the manufacturing method of heat-dissipating element according to the present invention.

The difference between the instant embodiment and the first embodiment is in the shape of the aluminum extrusion processed in step 1, wherein the two sop plates 2 of the aluminum extrusion bend towards opposite surfaces from two sides of the bottom plate 1. The two stop plates 2 have the same size and disposition, and both are perpendicular to the bottom plate 1.

Figure 6:
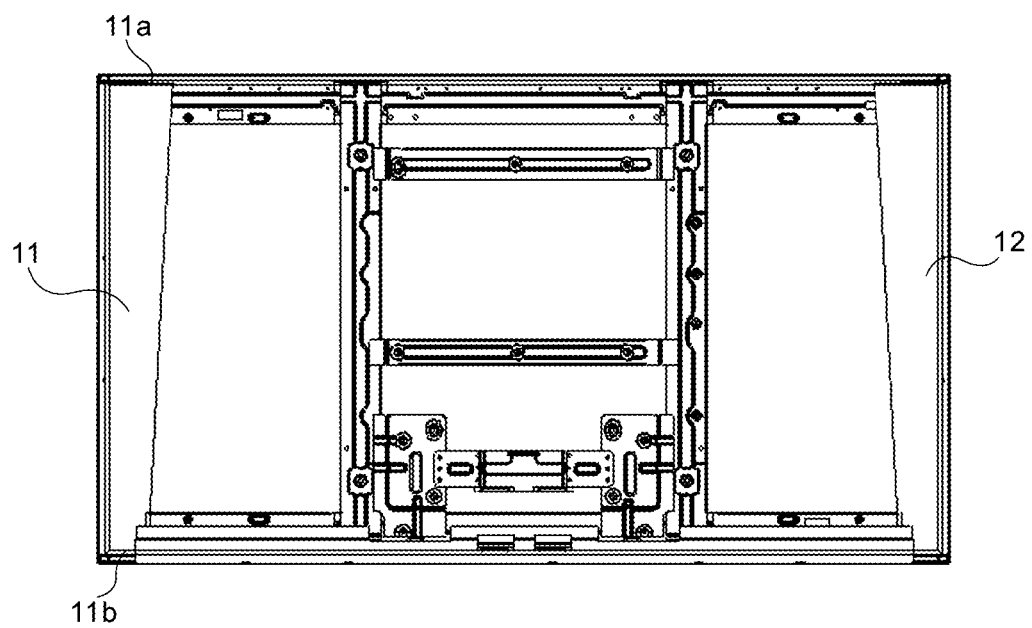
FIG. 6 is a rear view showing the structure of a backlight module of according to the present invention.
Figure 7:
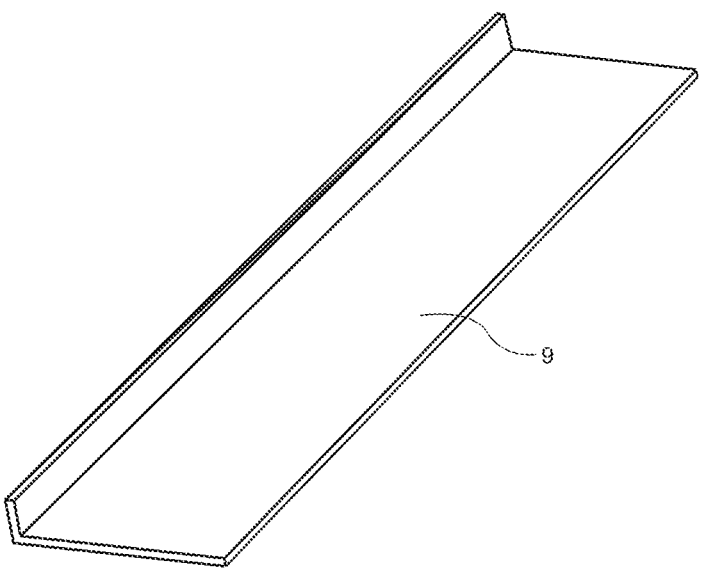
FIG. 7 is a schematic view showing the structure of an aluminum extrusion used in known direct-lit backlight module.

The purpose of the shape of the aluminum extrusion is: through the cutting in step 2, two symmetrical heat-dissipating elements can be obtained. As such, two heat-dissipating elements cut from the same heat-dissipating element body can be applied to the same backlight module to realize disposing the end with larger area of two heat-dissipating elements on the same side of the backlight module, for example, as shown in FIG. 6. FIG. 6 is a rear view showing the structure of a backlight module of according to the present invention.

Two aluminum extrusions 11, 12 are two heat-dissipating elements of symmetrical shape cut from a same heat-dissipating element body, and can be disposed on the left and right sides of the backlight module as shown in FIG. 6.

After installation, the top end with larger heat-dissipating area of the two aluminum extrusions 11, 12 are placed at the upper and middle part of the backlight module where the heat concentrates. The lower part of the module with less heat can achieve optimal dissipation with the bottom edge of the aluminum extrusion.

Through the heat-dissipating element, manufacturing method and backlight module of the present invention, a heat-dissipating element body can be cut into at least two heat-dissipating elements of same shape or symmetrical shape, and the heat-dissipating aluminum extrusion of the same specification can be manufactured for a large amount to improve manufacturing efficiency as well as preparing trapezoidal heat-dissipating element to match the shape of heat concentrated area of the backlight source of the backlight module to maintain optimal heat-dissipating effect. As such, the material used in manufacturing heat-dissipating elements is saved for cost down.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. A manufacturing method of heat-dissipating element, which comprises:
    processing a heat-dissipating element body with a bottom plate and at least two stop plates, the stop plates being disposed at two sides of the bottom plate and bending towards surface;
    cutting from the bottom plate of the heat-dissipating element body at a position between the two stop plates to form heat-dissipating element, the dissipating element at least comprising two heat-dissipating elements of same shape or of symmetric shape, wherein each of the two heat-dissipating elements comprises a corresponding one of the two stop plates disposed at one side of the bottom plate of the heat-dissipating element, the bottom plate of the heat-dissipating element comprises two parallel top edge and bottom edge located at two opposite ends connecting the one side of the bottom plate of the heat-dissipating element, length of the top edge is greater than length of the bottom edge.

2. The manufacturing method of heat-dissipating element as claimed in claim 1, characterized in that the step of cutting the heat-dissipating element body to form heat-dissipating element satisfies the following condition:
    the bottom plate of the heat-dissipating element has a trapezoidal shape with a right angle, and the one side of the bottom plate of the heat-dissipating element at which the corresponding one of the two stop plates disposed is a right-angle side with the right angle of the trapezoidal bottom plate of the heat-dissipating element.

3. The manufacturing method of heat-dissipating element as claimed in claim 1, characterized in that the two stop plates bend towards the same surface of the bottom plate.

4. The manufacturing method of heat-dissipating element as claimed in claim 1, characterized in that the two stop plates bend towards opposite surfaces of the bottom plate of the heat-dissipating element body and the step of cutting the heat-dissipating element body to form heat-dissipating element comprises:
    stamping to cut the heat-dissipating element body to form two heat-dissipating elements of the same shape.

5. The manufacturing method of heat-dissipating element as claimed in claim 4, characterized in that the step of cutting the heat-dissipating element body to form heat-dissipating element satisfies the following condition:
    the bottom plate of the heat-dissipating element has a trapezoidal shape with a right angle, and the one side of the bottom plate of the heat-dissipating element at which the corresponding one of the two stop plates disposed is a right-angle side with the right angle of the trapezoidal bottom plate of the heat-dissipating element.

6. The manufacturing method of heat-dissipating element as claimed in claim 5, characterized in that the heat-dissipating element body is manufactured by extrusion.

7. The manufacturing method of heat-dissipating element as claimed in claim 5, characterized in that the heat-dissipating element body has a rectangular shape.

8. The manufacturing method of heat-dissipating element as claimed in claim 3, characterized in that the step of cutting the heat-dissipating element body to form heat-dissipating element comprises:
    stamping to cut the heat-dissipating element body to form two heat-dissipating elements of the same shape.

9. The manufacturing method of heat-dissipating element as claimed in claim 1, characterized in that the heat-dissipating element body is aluminum extrusion.

10. The manufacturing method of heat-dissipating element as claimed in claim 1, characterized in that the heat-dissipating element is aluminum extrusion.

* * * * *